United States Patent [19]

Granström et al.

[11] 4,403,327
[45] Sep. 6, 1983

[54] ARC FURNACE CHARGE-PREHEATING POWER SUPPLY SYSTEM

[75] Inventors: Staffan Granström; Sven Ivner, both of Västerås, Sweden

[73] Assignee: ASEA AB, Västerås, Sweden

[21] Appl. No.: 256,139

[22] Filed: Apr. 21, 1981

[30] Foreign Application Priority Data

Apr. 25, 1980 [SE] Sweden .............................. 8003140
Jul. 3, 1980 [SE] Sweden .............................. 8004925

[51] Int. Cl.³ ............................................ F27D 13/00
[52] U.S. Cl. ........................................ 373/80; 373/4; 373/78; 373/148; 373/102
[58] Field of Search ................ 373/2, 4, 80, 102, 104, 373/142, 147, 148

[56] References Cited

U.S. PATENT DOCUMENTS 2,206,608 7/1940 Kikuchi et al. ..................... 373/147
2,215,045 9/1940 Kikuchi et al. ..................... 373/147
3,193,758 7/1965 Friedlander .................... 373/102 X

*Primary Examiner*—Roy N. Envall, Jr.
*Attorney, Agent, or Firm*—Kenyon & Kenyon

[57] ABSTRACT

At least one arc furnace and at least one induction furnace are connected to the same AC network, the induction furnace being connected via a controllable alternating voltage converter so as to permit compensation of active power fluctuations in the network caused by operation of the arc furnace and the induction furnace being designed to contain scrap for its inductive preheating before charging in the arc furnace.

10 Claims, 19 Drawing Figures

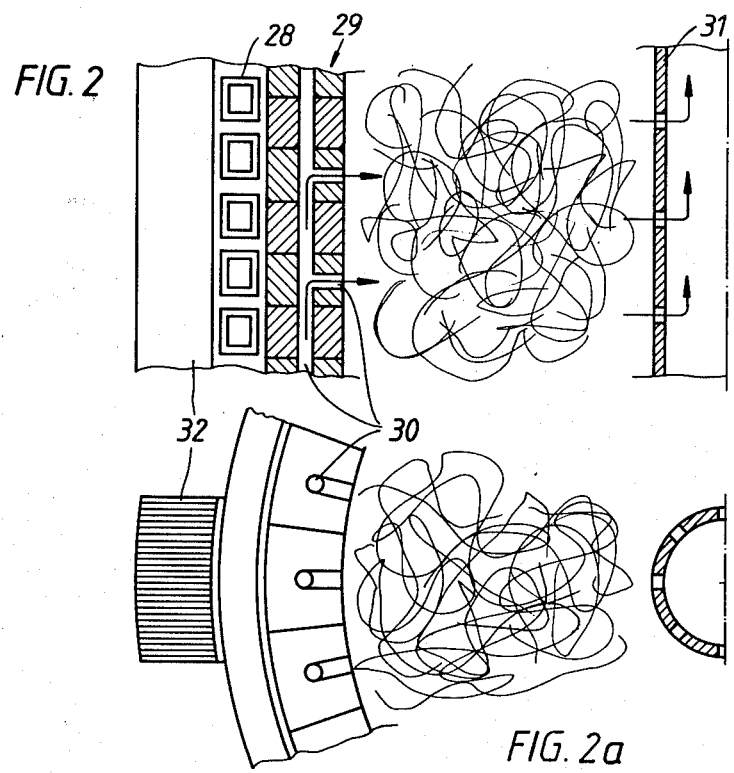
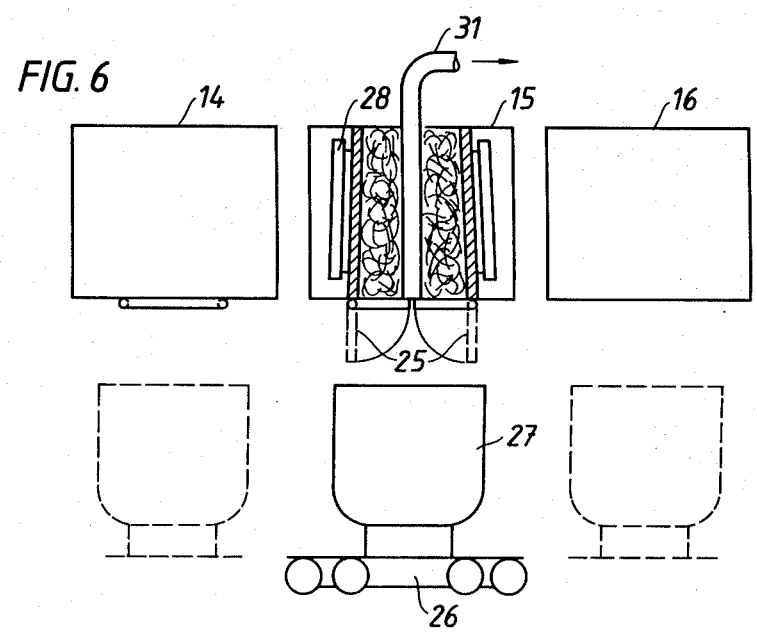

ARC FURNACE CHARGE-PREHEATING POWER SUPPLY SYSTEM

BACKGROUND OF THE INVENTION

Arc furnaces used for steel making are usually connected to two or three phase AC networks powdered by generators.

During the meltdown stage in particular, arc furnaces subject their power supply systems to difficult load problems. The reactive power fluctuations are great and cause voltage fluctuations normally compensated by reactive power compensation, such as by static systems comprising thyristor-connected capacitors or phase-angle controlled reactors with the compensation possibly completed by harmonic filters. A phase-angle controlled reactor normally consists of a number of single-phase air reactors, one for each phase of the current.

Such compensating means cannot compensate the active power fluctuations, although the active power may be balanced.

In relatively weak networks, the active power fluctuations give rise to disturbing power fluctuations despite compensation of the reactive power fluctuations. When arc furnaces are connected to such networks in the vicinity of the power generators, these active power fluctuations may be detrimental to the generators as well as their driving turbines. Current asymmetries and power fluctuations are severe problems.

Arc furnaces are customarily charged with cold scrap, and during the meltdown stage the arcs consume substantial power while raising the temperature of such charges to melting temperatures.

The object of this invention is to reduce the effect of the active power fluctuations on the network, and in addition, to preheat the scrap so that when charged in an arc furnace its meltdown requires less arc power consumption.

SUMMARY OF THE INVENTION

The present invention provides compensation for the active power fluctuations by connecting one or more induction furnaces to the same network to which the arc furnace or furnaces are connected with this connection made via one or more controllable alternating voltage convertors. By controlling the power output to the induction furnace or furnaces, the power fluctuations from the arc furnace or furnaces can be equalized and an at least approximately constant power output obtained from the network. If DC arc furnaces are involved, they are connected to the AC network by convertors.

By making the induction furnace or furnaces so that they can be charged with the cold scrap, the latter can at the same time be inductively heated prior to being charged into the arc furnace or furnaces for melting. For this purpose crucible type induction furnaces can be specially designed with bottoms that can be opened so that after a cold charge warm-up period, the charge can be dropped into ladles similar to steel ladles, carried by trolleys for transport to and charging of the arc furnace or furnaces. Neither the induction furnaces nor the ladles need be required to contain molten steel.

It follows that the furnace combination of this invention provides both compensation for arc furnace loading of the supply network and prewarming of the arc furnace charges, thereby reducing the meltdown power consumption.

DESCRIPTION OF THE DRAWINGS

The accompanying drawings are for use in connection with the following detailed description of the invention, the various views being as follows:

FIG. 2 is a schematic vertical section of an induction preheating furnace designed for use in the practice of this invention;

FIG. 2a is a horizontal cross section of FIG. 2;

FIG. 6 schematically shows the mechanical details of induction furnaces having bottom discharge arrangements and a hot-scrap ladle trolley running beneath the furnaces;

DETAILED DESCRIPTION OF THE INVENTION

Figure 1:
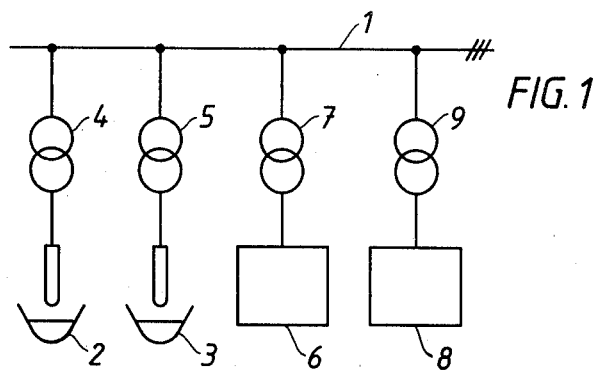
FIG. 1 diagrammatically provides an explanatory introduction.

As an explanatory introduction, FIG. 1 shows what may be a conventional alternating voltage network 1, often a three-phase network. Two arc furnaces 2 and 3 are each connected to this network respectively by transformers 4 and 5. This network is shown connected to a reactive power compensator 6 for voltage stabilization and compensation of the reactive powers, this compensator being connected to the network by a transformer 7 which although not illustrated may consist, for example, of thyristor connected capacitors or a phase-angle controlled reactor, possibly with harmonic filters.

The compensator of the present invention for the active power fluctuations is indicated by the box 8 as being connected to the same network 1 through a transformer 9.

Figure 3:
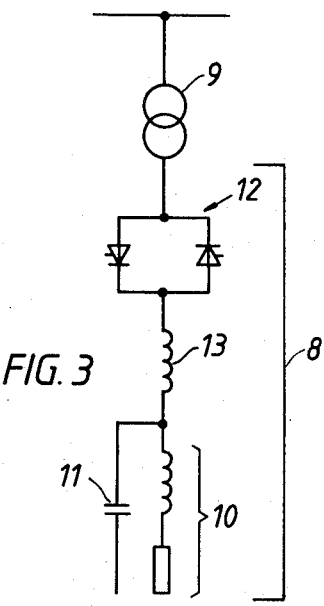
FIG. 3 diagrammatically shows one of the induction furnaces and its alternating voltage convertor.

This active power compensator 8 is diagrammatically shown by FIG. 3 as comprising an induction furnace 10 having the usual parallel capacitor 11 and connected to the network 1 via a controllable alternating voltage convertor and the transformer 9. This convertor can comprise two anti-parallel connected thyristors 12 connected with a reactor 13 which connects with the induction furnace 10. By measuring the fluctuations in the network 1 from the arc furnaces 2 and 3 in the known manner, the measuring signal obtained can be used to control the thyristors 12 so that a relatively constant total power output Pref can be obtained as follows:

The reactive powers from the arc furnaces 2, 3 and the active power compensator 8 (W) are compensated phase by phase with the reactive power compensator 6, which also symmetrizes the active powers P from the arc furnace (multiphase R,S,T, or several single-phase furnaces) and the induction furnaces, for example according to the following conditions:

$$Q(VAR)_{RS} = -(Q(U+W)_R + Q(U+W)_S - Q(U+W)_T)$$

$$Q(VAR)_{ST} = -(-Q(U+W)_R + Q(U+W)_S + Q(U+W)_T)$$

$$Q(VAR)_{TR} = -(Q(U+W)_R - Q(U+W)_S + Q(U+W)_T)$$

The compensator 8 is controlled for each phase so that the active powers in the arc furnaces 2, 3 and the induction furnace 10 are constant according to the following control conditions:

$$PU(t) + PW(t) = \text{Pref}$$

or $$PWRS = \tfrac{1}{3}\text{Pref} - (PUR + PUS - PUT)$$

$$PWST = \tfrac{1}{3}\text{Pref} - (-PUR + PUS + PUT)$$

$$PWTR = \tfrac{1}{3}\text{Pref} - (PUR - PUS + PUT)$$

Pu(t) is the arc furnace power, Pw(t) the induction furnace power and Pref the total power. R, S and T are the three phases.

Figure 4:
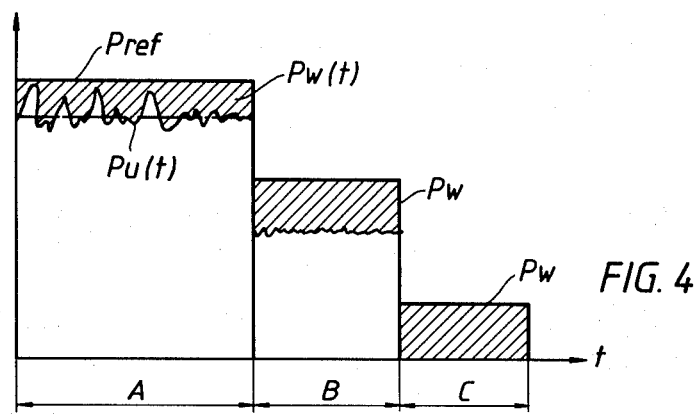
FIG. 4 is a graphical representation of the furnace combination results.

The induction furnace 10 is designed so that it can be charged with cold scrap for its preheating before the scrap is charged in the arc furnaces shown at 2, 3. Referring to FIG. 4, the procedure is as follows:

During the first stage A of the operation of the furnace combination, the arc furnace meltdown stage, the power to the preheating furnace 10 is controlled such that the tips of Pu(t) are compensated and Pref becomes relatively constant. The power Pw(t) to the preheating furnace is shown in the crosshatched region.

After the meltdown is completed, the final treatment starts in the arc furnace, that is, the arc power is reduced (stage B), and the tips grow smaller. However, the preheating of the scrap with which the arc furnace is later on to be charged, continues (according to Pw). During the tapping (service stage C), the arc furnace power is set to zero, and only preheating (Pw) is carried out.

Figure 5:
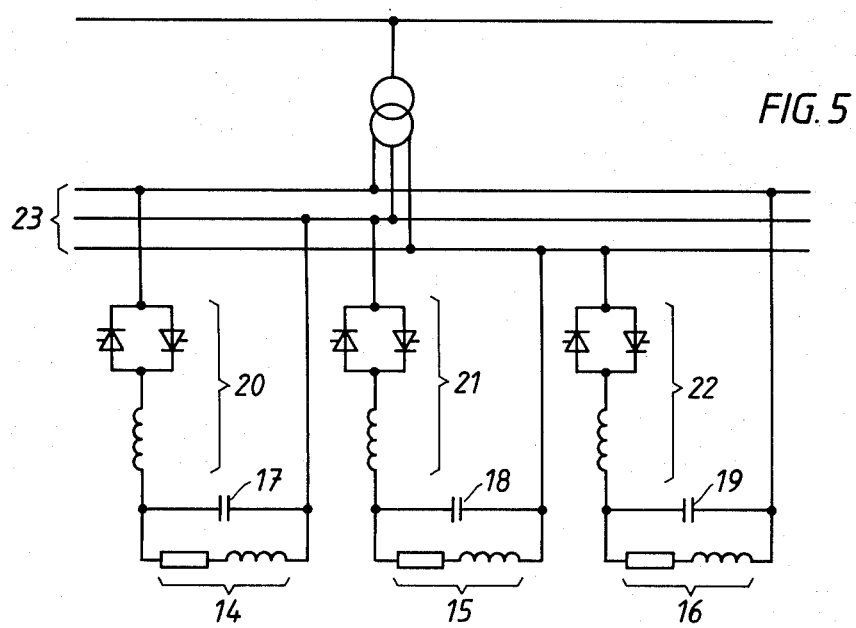
FIG. 5 diagrammatically shows a three-phase system using three single phase induction furnaces for the compensation.

The scrap preheating arrangement may consist of three single-phase induction furnaces as shown at 14, 15, 16 in FIG. 5, with parallel capacitors 17–19 connected to the three-phase network 23 via separate alternating voltage convertors 20, 21, 22, for example, each of the same kind as shown in FIG. 3. The furnaces 14–16 may also be one or more three-phase induction furnaces.

The furnaces 14 to 16 may be conical induction crucible furnaces as shown by FIG. 6, with openable bottoms 25, positioned in a row above one or more trolleys 26 carrying ladle-like scrap containers 27. The induction furnaces 14–16 can be charged with scrap in a conventional manner. When the arc furnaces are to be charged with the preheated scrap, the bottom 25 of the appropriate induction furnace is opened and the preheated scrap falls into the scrap container 27 below that furnace to be forwarded to the arc furnace to be charged.

The furnaces 14–16 for preheating the scrap are conical so as to have a bottom which is wider than the upper portion of prevent hanging of the scrap. As the power is developed at the periphery, the energy must be transported towards the center. As shown in FIG. 2, each furnace is lined with perforated hard brick, in which there are provided channels 30 for air. Air is then sucked from the periphery towards the center and is carried away from the furnace by a vertical exhaust tube 31 on the axis of the furnace. 32 designates laminated cores and 28 the furnace coil, in FIGS. 2, 2a. The air sucked first through the furnace periphery where the scrap is most intensively inductively heated, carries heat to the furnace center where the scrap would otherwise be heated less.

After cleaning, the exhausted heated air may be used either for local heating or as combustion air, for example, for ladle preheating.

Figure 7A:
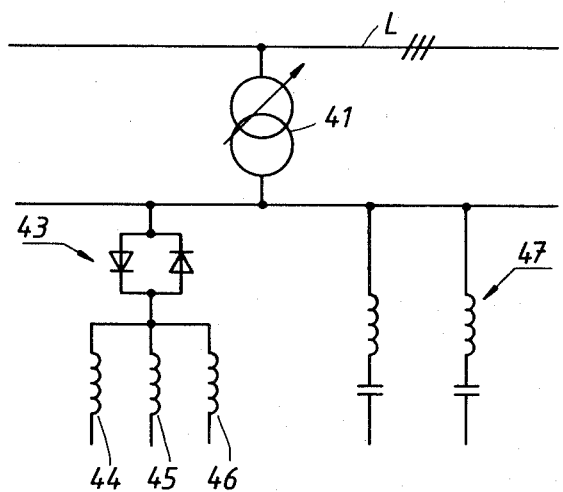
FIG. 7a diagrammatically shows how several induction furnaces can be used connected to a common supply.
Figure 7B:
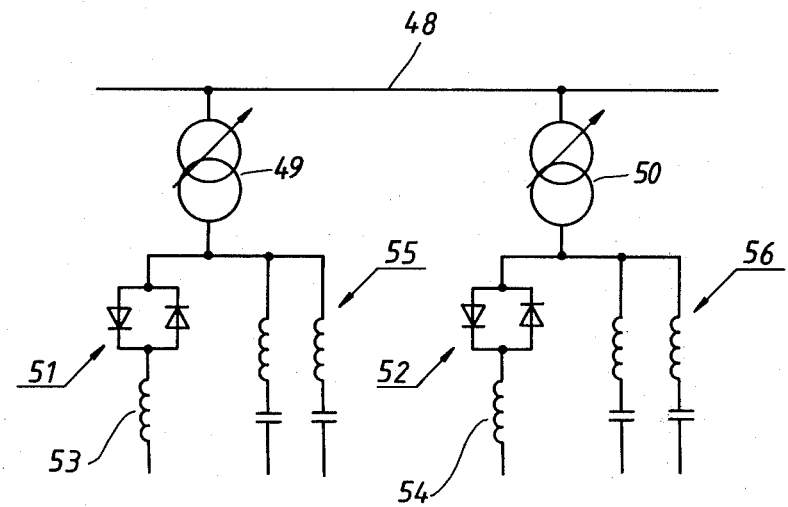

FIGS. 7a and 7b show a combination according to the above embodiment of the invention, consisting of several induction furnaces supplied by a common transformer 41 from a multi-phase network L. Alternatively, one transformer may be used for each module. To the secondary side of the transformer 41 there is connected a common alternating voltage convertor 43, but alternatively separate such convertors may be used for the different induction furnaces. Three induction furnaces, 44, 45 and 46, included in the different induction modules, are connected to said alternating voltage convertor 43, and parallel to said convertor 43 and the furnaces 44–46 there are connected one or several fixedly connected harmonic filters 47, which are tuned to different frequencies to reduce the harmonics.

FIG. 7b shows separate supply of the different induction furnace modules by a multi-phase network 48. It also shows separate transformers 49 and 50, each of which supplies an alternating voltage convertor 51 and 52 with its connected induction furnaces 53 and 54, respectively, and harmonic filters 55 and 56, respectively, connected in parallel with said convertors and said furnaces.

Figure 8:
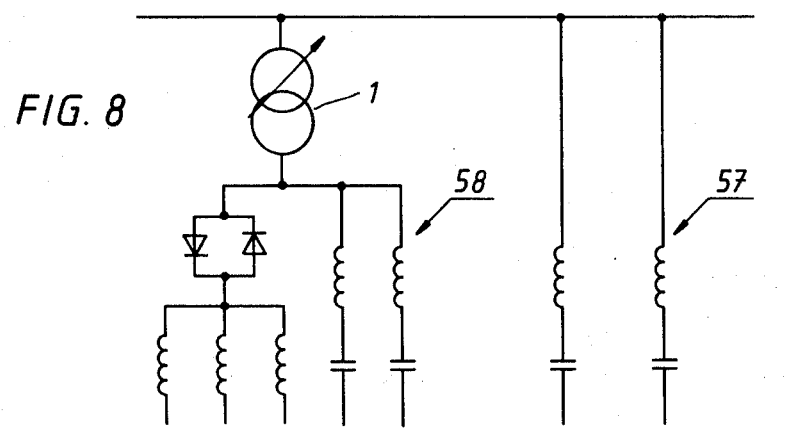
FIG. 8 schematically shows a division of the compensation system.

To reduce the rated power of the transformer 41, also the fixed power factor correction may be divided into two equal halves, one half being connected to the primary side 57 of the transformer and the other to the secondary side 58 of the transformer 41 (see FIG. 8).

Figure 9A:
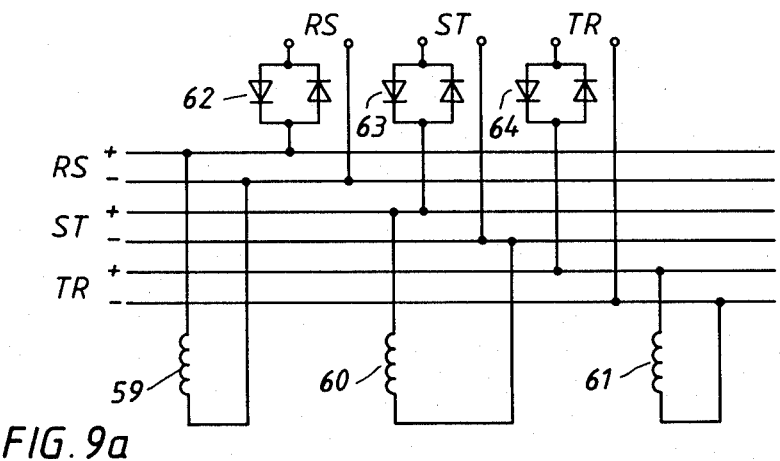
FIG. 9a diagrammatically shows the connection of three single phase induction furnaces.
Figure 9B:
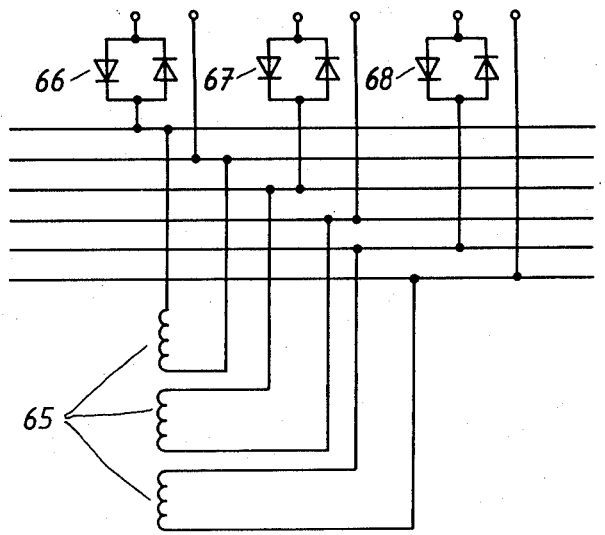
FIG. 9b diagrammatically shows the connection of a three-phase induction furnace to a three-phase network.

According to FIGS. 9a and 9b, the scrap heating furnaces may consist of either of three single-phase, vertical induction furnaces (see FIG. 9a) 59, 60 and 61, which are each provided with an openable bottom and which are each connected to a single-phase alternating voltage convertor RS, ST, TR, or of alternating voltage convertors 62, 63, 64 via busbars RS, ST, TR (+ and −). It is also possible to connect one or more three-phase induction furnaces with an openable bottom to the network, for example according to FIG. 9b. The induction furnace is shown at 65 and the different alternating voltage convertors at 66, 67, and 68. Since the compensator must be adjusted phase by phase for symmetrization of the active powers from the arc furnaces, it is an advantage to have one or more three-phase furnaces.

Figure 10A:
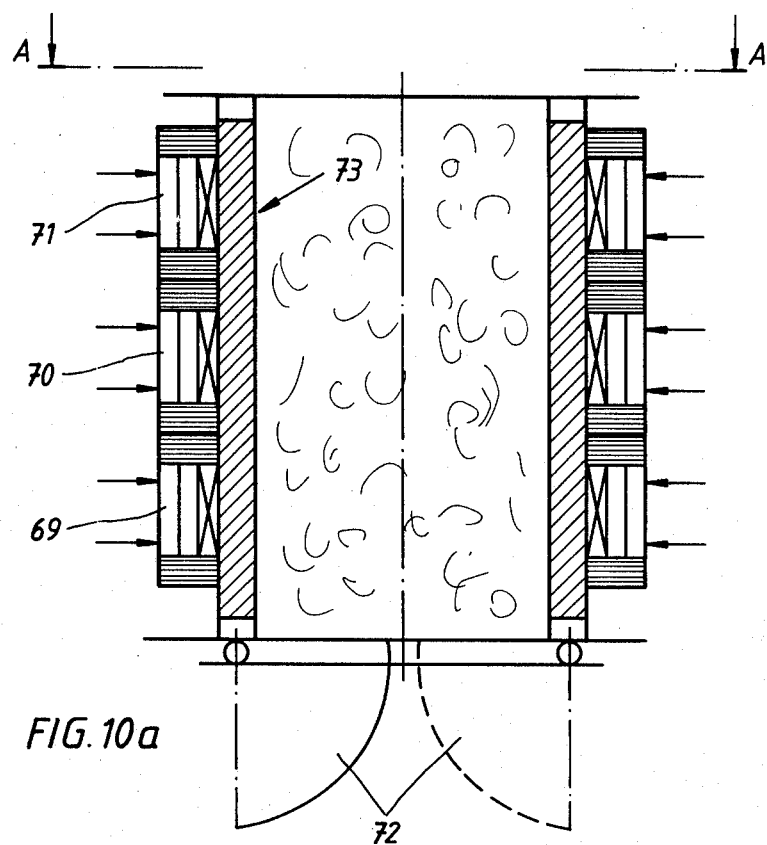
FIG. 10a is a schematic vertical section of a suitable three-phase induction furnace.
Figure 10B:
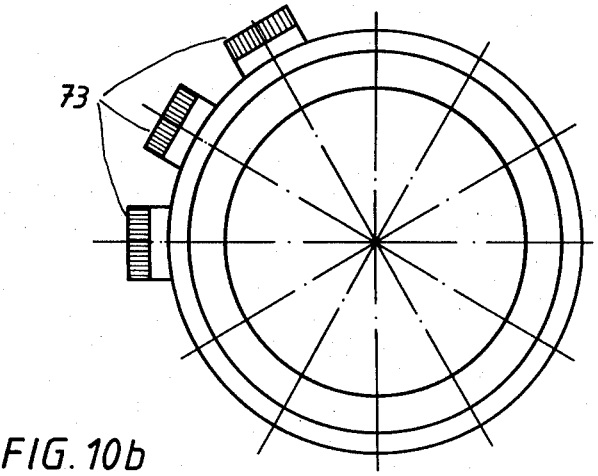
FIG. 10b is a cross section taken from the line A—A in FIG. 10.

To reduce the effect of the mutual inductance between the different coils, the furnaces may be constructed in three different sections (see FIG. 10), which are surrounded by iron cores and stacked on top of each other. These sections are shown at 69, 70 and 71. The furnace is designed with refractory lining 74 and with an openable bottom 72. The bottom part of FIG. 10 shows a section along the line A—A of the upper part of FIG. 10, the iron cores being shown at 73.

Figure 11:
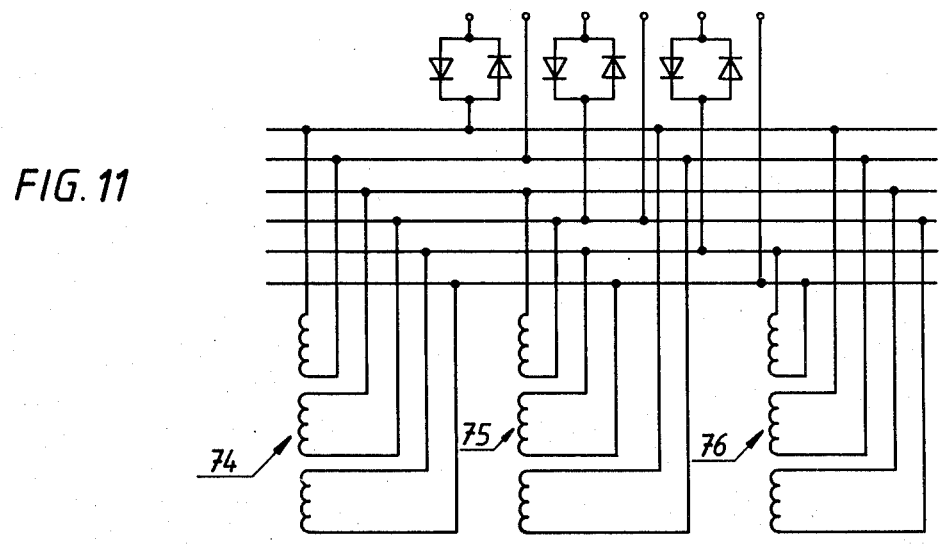
FIG. 11 diagrammatically shows how several three-phase furnaces may be connected.

To further reduce the mutual inductance between the coils in the case of two or more three-phase furnaces, the furnaces may be connected alternately to different phases according to FIG. 11. The furnaces are shown at 74, 75 and 76.

In the same way as with the device according to the alternative described above, the furnaces are provided with an openable bottom 77 and provided with a flue gas exhaust 78. The furnaces are placed with the openable bottoms in a row above a trolley path for scrap containers 79. The furnaces are charged with scrap in a conventional manner. When the arc furnaces are to be charged with the scrap, the bottom is opened and the preheated scrap falls into the scrap container below the furnace to be forwarded to the arc furnaces, as shown by FIG. 12.

Figure 13:
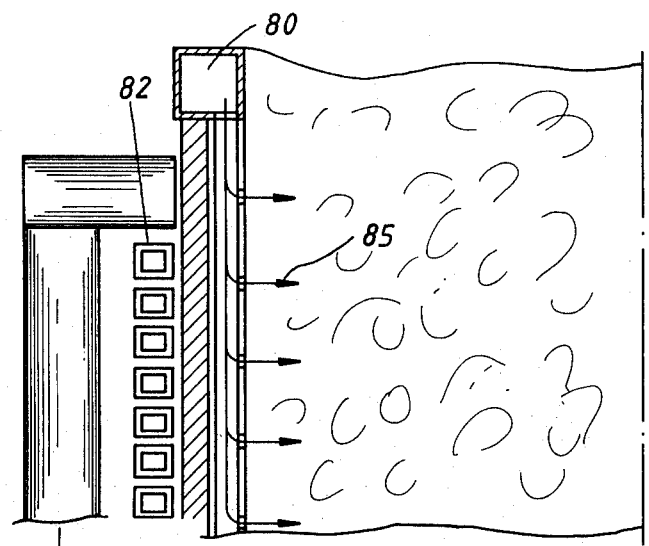
FIG. 13 schematically shows in a vertical sectioned view a modification of FIG. 2.
Figure 13A:
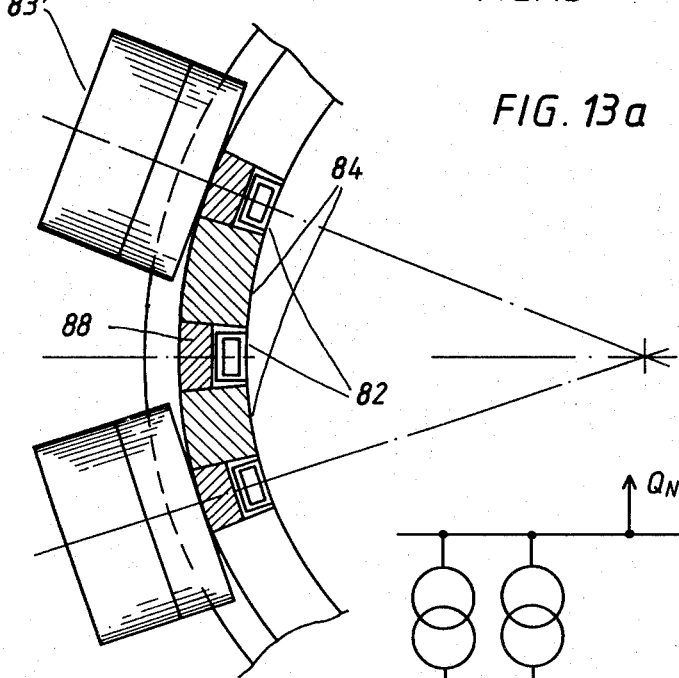
FIG. 13a is a cross section of FIG. 13.

Since the power is developed at the periphery, the energy must be transported towards the center. This is done as follows:

The furnace is designed with so-called guide tubes 80 (see FIGS. 13 and 13a) which are made rectangular and non-magnetic with a small radial extension and positioned between the coil and the scrap. The coil is shown at 82 and the iron core at 83. Refractory bricks 84 are arranged between the guide tubes 80. The guide tubes 80 are provided with holes, directed towards the center of the coil (see FIG. 13), through which air is blown. See the arrows 85. The air which is blown through the guide tube 80 thus transports part of the thermal energy from the periphery towards the center. As will be seen, the furnace is lined with a hard, ceramic material, such as refractory brick 84, between the guide tubes 80.

Figure 12:
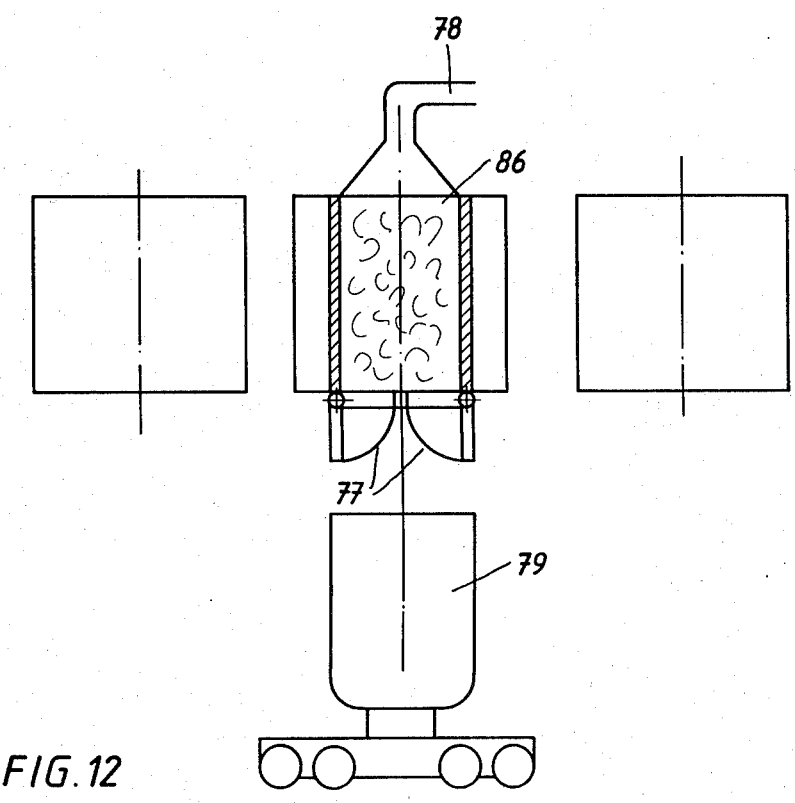
FIG. 12 is a modification of FIG. 6.

Above the furnace there is placed a hinged lid with a flue gas exhaust 78 (see FIG. 12). The energy is the exhaust gases may be used for heating premises or for other purposes. The scrap charge is shown at 86.

Figure 14:
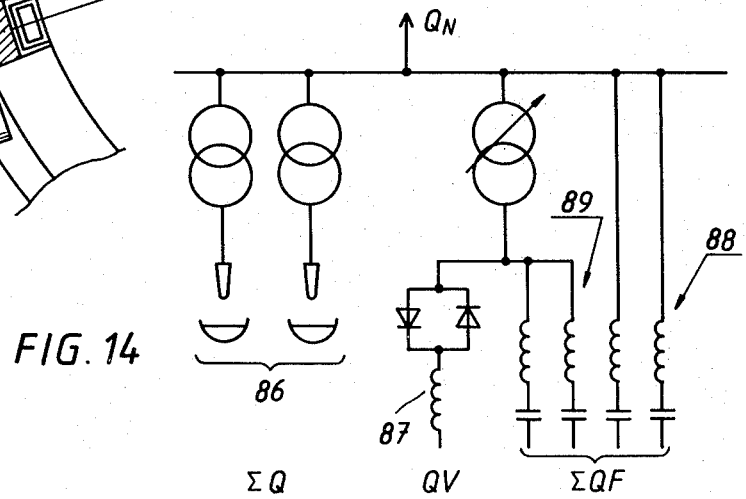
FIG. 14 diagrammatically shows a modification or further improved version of the invention as it is shown very basically by FIG. 1.

According to FIG. 14, the reactive power compensator is controlled with the following control conditions:
$\epsilon Q$ = Reactive power in the arc furnaces 86
$\epsilon Q_F$ = Reactive power in the fixed compensation 89
$Q_N$ = Reactive power to the network
$Q_V$ = Reactive power in the induction furnaces 88.

The following conditions are obtained:

$$\epsilon Q + Q_V - \epsilon Q_F - Q_N = 0;$$

$$Q_V = \epsilon Q_F - \epsilon Q + Q_N$$

To balance the active power in the arc furnaces, the induction furnaces may be regulated phase by phase according to the conditions:

$$QV_{RS} = -(QR + QT = QT)$$

$$QV_{ST} = -(QR + QS - QT)$$

$$QV_{TR} = -(QR - QS + QT)$$

where QR, QS and QT are the reactive powers at the different phases R, S and T.

Depending on the scrap composition and the temperature regulation, the impedance in the furnaces will be changed from charge to charge and during each charge. The alternating voltage convertors are suitably controlled by means of changes of the ratio of voltages of the transformer or by means of any other type of phase angle control. Since the impedance in the furnaces is relatively constant, the active power in the induction furnaces will vary in proportion to the reactive power.

I claim:

1. An arc furnace charge-preheating power supply system comprising an AC network for supplying electrical power, at least one arc furnace connected to said network, at least one induction furnace and a controllable alternating current convertor connecting said induction furnace to said network, said induction furnace being adapted to be charged with cold scrap so as to preheat the scrap prior to charging said scrap in said arc furnace, said convertor being adjustable so as to compensate for active power fluctuations from said arc furnace and to maintain a substantially constant total active power supplied by said AC network.

2. The system of claim 1 in which said controllable alternating voltage convertor comprises at least two antiparallel-connected thyristors and at least one reactor.

3. The system of claim 1 in which a reactive power compensator is also connected to said network so as to compensate reactive power fluctuations in the network.

4. The system of claim 1 in which said induction furnace has a bottom adapted to be opened so as to discharge preheated scrap and a transportable scrap ladle is positionable below said bottom.

5. The system of claim 1 in which said induction furnace has means for flowing air from its periphery towards its central portion so as to carry heat from its periphery to its central portion.

6. The system of claim 5 in which said means comprises said induction furnace having side wall lining bricks forming inwardly directed air flow openings.

7. The system of claim 1 in which said network is a multi-phase network and a single-phase induction furnace is connected to each phase via a controllable alternating voltage convertor.

8. The system of claim 1 in which said network is multiphase and said induction furnace is a multi-phase induction furnace with its phase connections connected to the corresponding phases of the network.

9. The system of claim 1 in which said induction furnace is controlled by the active power fluctuations in the arc furnace.

10. The system of claim 1 in which said induction furnace is controlled by the reactive power in the arc furnace.

* * * * *